(12) United States Patent
Haddad

(10) Patent No.: US 7,512,132 B2
(45) Date of Patent: Mar. 31, 2009

(54) QUALITY OF SERVICE (QOS) CLASS REORDERING

(75) Inventor: Reda Haddad, Raleigh, NC (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 734 days.

(21) Appl. No.: 10/936,314

(22) Filed: Sep. 8, 2004

(65) Prior Publication Data

US 2006/0050715 A1    Mar. 9, 2006

(51) Int. Cl.
*H04L 12/56* (2006.01)
(52) U.S. Cl. ............... 370/395.21; 370/235; 370/412
(58) Field of Classification Search ............ 370/230, 370/230.1, 237, 252, 331, 412, 235, 389, 370/395.21
See application file for complete search history.

(56) References Cited

U.S. PATENT DOCUMENTS

| | | | | |
|---|---|---|---|---|
| 6,023,456 | A * | 2/2000 | Chapman et al. | 370/252 |
| 6,363,053 | B1 * | 3/2002 | Schuster et al. | 370/230 |
| 6,515,974 | B1 * | 2/2003 | Inoue et al. | 370/331 |
| 6,633,575 | B1 * | 10/2003 | Koodli | 370/412 |
| 6,822,940 | B1 * | 11/2004 | Zavalkovsky et al. | 370/237 |
| 6,839,327 | B1 * | 1/2005 | Zavalkovsky et al. | 370/252 |
| 7,006,437 | B2 * | 2/2006 | Ogier et al. | 370/230.1 |
| 7,209,482 | B1 * | 4/2007 | Rahim | 370/394 |
| 7,281,201 | B2 * | 10/2007 | Kumar et al. | 715/255 |

| | | | |
|---|---|---|---|
| 2004/0042456 | A1 | 3/2004 | Dittmann et al. |
| 2004/0044796 | A1 | 3/2004 | Vangal et al. |

FOREIGN PATENT DOCUMENTS

| | | |
|---|---|---|
| EP | 1372306 A | 12/2003 |
| WO | WO 00/56013 A | 9/2000 |

OTHER PUBLICATIONS

Stephan Bohacek, et al; TCP-PR: TCP for Persistant Packet Reordering; Proceedings of the 23rd International Conference on Distributed Computing Systems (ICDCS'03);1063-6927/03 2003 IEEE;p. 222-p. 231.
J. Heinanen, et al; Assured Forwarding PHB Group; Jun. 1999.
S. Blake, et al; An Architecture for Differentiated Services; Dec. 1998.
K. Nichols, et al; Definition of the Differentiated Services Field (DS Field) in the IPv4 and IPv6 Headers; Dec. 1998.
R. Braden, et al; Integrated Services in the Internet Architecture: an Overview; Jun. 1994.
Reda Nassif Haddad; SLA to Controls Mapping in Differentiated Services; Thesis to the Graduate Faculty of North Carolina State University, Raleigh; 2000.

\* cited by examiner

*Primary Examiner*—Hassan Kizou
*Assistant Examiner*—Emmanuel Maglo
(74) *Attorney, Agent, or Firm*—Roger S. Burleigh

(57) ABSTRACT

A network is described herein which includes a node and a downstream node where the node is capable of altering a Quality of Service (QoS) class of one client (packet) which is associated with a plurality of clients (packets) in a manner such that when the downstream node receives and processes the altered client and the associated clients it will not reorder the altered client and the associated clients.

6 Claims, 3 Drawing Sheets

QUALITY OF SERVICE (QOS) CLASS REORDERING

BACKGROUND OF THE INVENTION

1. Field of the Invention

The present invention relates to a quality of service (QoS) queuing system and a method for queuing clients (packets) in a manner that eliminates the reordering of the clients even after a QoS class of one of the clients is altered (promoted/demoted).

2. Description of Related Art

Mechanisms that provide various levels of QoS use schedulers and queues to offer privileged treatment or services to clients (jobs) that request those services. Clients can vary from rental car customers waiting to be served in various queues depending on their membership level, to processes waiting to be executed on a computer . . . to packets belonging to various QoS classes waiting to be serviced by a router in a network.

In queuing systems, clients with higher precedence classes have higher service rates or get serviced before the clients with lower precedence classes. The privilege given to clients with higher precedence classes causes a relatively shorter waiting time for them when compared to clients with lower precedence classes. As a result, the clients in the higher precedence classes in general leave the system earlier than the clients in the lower precedence classes. To accomplish this, the queuing system often reorders the sequence of clients to service the higher precedence clients before the lower precedence clients.

In some cases, when there are no clients with higher precedence classes waiting to be serviced, the queuing system may decide to "promote" a lower precedence class client to be serviced as a high precedence class client. This may be done to keep the efficiency high in the queuing system. In other cases, when a high precedence class is over-booked with clients then the queuing system may decide to "demote" a higher precedence class client to be serviced as a low precedence class client. After the queuing system "remarks" (promotes or demotes) a client, there is an interest at least for fairness to service in order the remarked client and the other clients that originally belonged to the same precedence class. However, in the traditional queuing systems like the ones used in routers of a network shown in FIG. 1, whenever a packet (client) is promoted or demoted from one QoS class to another QoS class this may result in packet reordering either in the same node where the remark occurred or in a downstream node due to the placement of packets in different queues which observe different latencies. The reordering of packets is not desirable for reasons described below with respect to FIG. 1.

Referring to FIG. 1 (PRIOR ART), there is shown a network 100 which has a source computer 102 (user 102) that communicates with a destination computer 104 (user 104) via multiple routers/nodes 106 (only 9 routers/nodes 106 shown). Each router 106 includes a queuing system 108 with a queue 110 and a scheduler 112 that stores and implements a traditional QoS method 114. An example of the operation of the traditional QoS method 114 is described next with respect to two routers 106' and 106". Assume three packets are received at the router 106' in the order 1, 2, 3. The first and the third packets belong to the same flow (e.g. Transmission Control Protocol (TCP) flow) and have a 'lower precedence' QoS class than the second packet which belongs to another flow. As such, packets 1 and 3 are stored in a lower precedence queue than packet 2. Assume packets 2 and 3 arrive at the time when packet 1 was being transmitted to router 106". After packet 1 is transmitted, the scheduler 112 in router 106' schedules packet 2 to go after packet 1 since packet 2 has a higher precedence class than packet 3. Assume also that packet 3, having complied with a certain policy, was promoted by the scheduler 112 in router 106' to a higher precedence class. In this example, the packets are transmitted in the order 1, 2, 3 to the downstream router 106".

At the downstream router 106", packet 1 waits in the lower precedence queue to be scheduled for transmission. Assume in this example that packet 1 finds packet 0 being transmitted so it has to wait. While packet 1 is waiting, packets 2 and 3 are received and queued in the higher precedence class. Upon completion of the transmission of packet 0, packets 2 and 3 are scheduled to go next since they are of higher precedence than packet 1. Notice that packets 1 and 3, which belong to the same flow, got reordered in the downstream router 106". This reordering of packets 1 and 3 is not desirable.

The reordering of packets is strongly discouraged mainly due to the high complexity and high cost associated with handling per flow reordering (as described below). If reordering is not handled properly, some higher layer protocols, like TCP for example, suffer a severe performance impact since out-of-order packets indicate packet loss and therefore congestion. This problem is described in more detail in the following references the contents of which are incorporated herein:

[1] S. Bohacek, J. P. Hespanha, J. Lee, C. Lim, K. Obraczka "TCP-PR: TCP for Persistent Packet Reordering", Proceedings of the 23rd International Conference on Distributed Computing Systems, May 2003.

[2] S. Blake, D. Black, M. Carlson, E. Davies, Z. Whang, and W. Weiss "An architecture for differentiated services", RFC 2475, 1998.

[3] J. Heinanen, F. Baker, W. Weiss, J. Wroclawski "Assured Forwarding PHB Group", RFC 2597, June 1999.

In fact, in some network technologies (e.g., Asynchronous Transfer Mode (ATM)), it is strictly prohibited to reorder packets or cells.

In all of these queuing systems, the reordering of clients (packets) which originally belong to the same flow or service class when they entered the system is not desired and maybe even prohibited. In systems where several stages of service are required, the aforementioned restriction implies some cost on the routers (servers) servicing the clients (packets) if they need to maintain the order. The problem becomes even more complex when clients come in batches (i.e. flows) all labeled with the same QoS or precedence class and merge with other client batches (flows) into the same QoS queue. Accordingly, there is a need for a new queuing system and method for queuing clients (packets) in a manner that overcomes the reordering problem associated with the traditional queuing system. This need and other needs are satisfied by the queuing system and method of the present invention.

SUMMARY OF THE INVENTION

The present invention includes a QoS queuing system and a method for queuing clients (packets) in a manner that eliminates the reordering of the clients even after a QoS class of one of the clients is altered (promoted/demoted). In one embodiment, the method eliminates the reordering of a plurality of clients that includes an altered client by marking the altered client, which is located within a first node (first router), with an indicator that indicates an old QoS class and a new QoS class of the altered client. Upon receiving the altered client at a second node (second router), the indicator in the altered client is checked. And, then the altered client is queued in the old QoS class and the other clients are queued in the old QoS class. At this time, the proxy client is also allocated in the new QoS class. Once the proxy client is scheduled to be serviced by the second node, a head-of-line client selected from one of the clients queued in the old QoS class is serviced as being in the new QoS class instead of servicing and sending the proxy client to a third node (third router). Finally, the second node marks the head-of-line client with an indicator that indicates the old QoS class and the new QoS class of the head-of-line client before sending the head-of-line client to the third node.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 2:
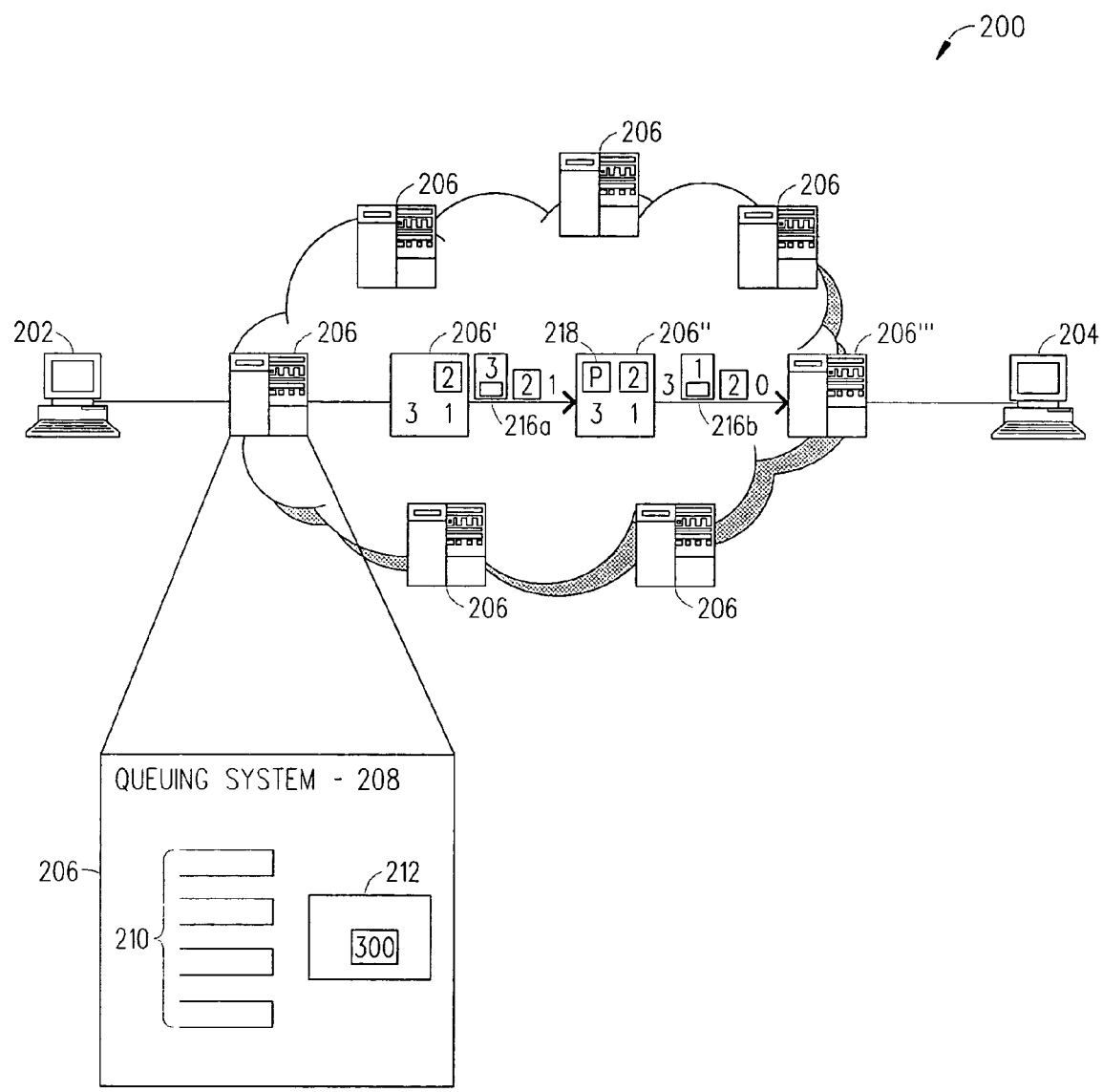
FIG. 2 is a block diagram of a network where a first user communicates with a second user through a series of routers/nodes each of which have a queuing system incorporated therein that implements a queuing method in accordance with the present invention.
Figure 3:
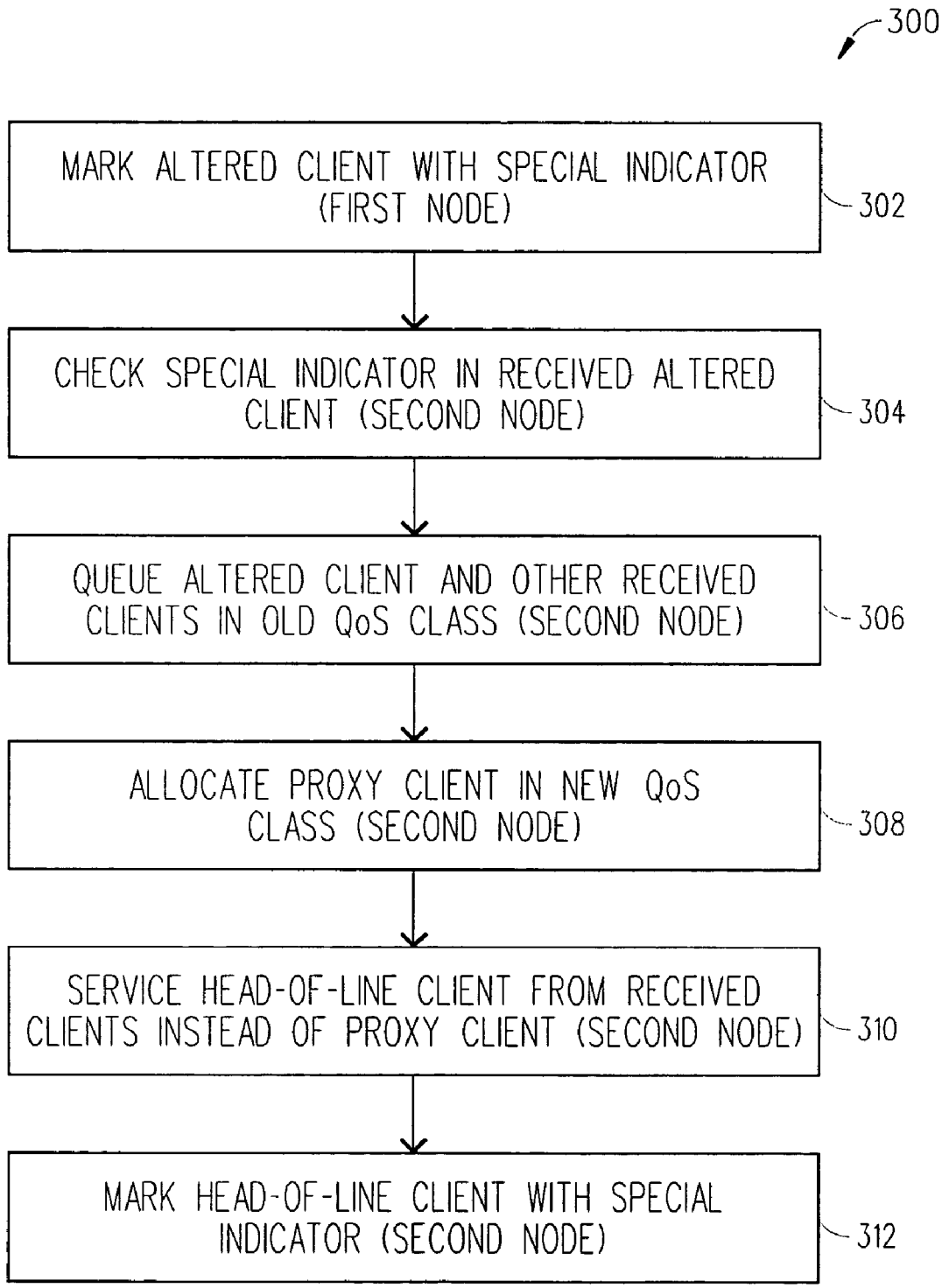
FIG. 3 is a flowchart illustrating the steps of the preferred queuing method used in each of the routers/nodes shown in FIG. 2 in accordance with the present invention.

Referring to FIGS. 2-3, there are disclosed a preferred embodiment of a network 200 and a preferred queuing method 300 in accordance with the present invention. Although an exemplary network 200 with routers 206 is used below to help describe the queuing method 300 of the present invention. It should be appreciated that the queuing method 300 can be used in any queuing model like bank queues, airline queues, etc. . . . and not just in a network 200. Accordingly, the queuing method 300 of the present invention should not be construed in a limited manner.

As shown in FIG. 2, the network 200 has a source computer 202 (user 202) that communicates with a destination computer 204 (user 204) via multiple routers/nodes 206 (only 9 routers/nodes 206 shown)). Each router 206 includes a queuing system 208 with a queue 210 and a scheduler 212 that stores and implements the queuing method 300 (see FIG. 3). As described in detail below, the queuing method 300 basically eliminates client reordering due to the alteration of a client's QoS class within a flow while maintaining the QoS treatment of that flow.

An example of the operation of the QoS queuing method 300 is described next with respect to two routers 206' and 206". Assume three packets are received at the router 206' in the order 1, 2, 3. The first and the third packets belong to the same flow (e.g. TCP flow) and have a 'lower precedence' QoS class than the second packet which belongs to another flow. As such, packets 1 and 3 are in a lower precedence queue than packet 2. Assume packets 2 and 3 arrive at the time when packet 1 was being transmitted to router 206". After packet 1 is transmitted, the scheduler 212 in router 206' schedules packet 2 to go after packet 1 since packet 2 has a higher precedence class than packet 3. Assume also that packet 3, having complied with a certain policy, was promoted by the scheduler 212 in router 206' to a higher precedence class. The altered packet 3, assuming originally it was in QoS class A and is now in QoS class B where QoS class B has higher precedence than QoS class A, is marked (step 302) with a special indicator 216a. The special indicator 216a is used to identify the old QoS class (e.g., QoS class A) of packet 3 as well as the new QoS class (e.g., QoS class B). The special indicator 216a also indicates that the class of service of packet 3 has been altered. Again, packet 3 had been promoted. In this example, the packets are transmitted in the order 1, 2, 3 to the downstream router 206".

At the downstream router 206", packet 1 waits in the lower precedence queue to be scheduled for transmission and assume packet 1 finds packet 0 being transmitted and has to wait. While packet 1 is waiting, packets 2 and 3 are received and packet 2 is queued in the higher precedence class. The downstream router 206" then checks (step 304) the special indicator 216a in packet 3 and then queues (step 306) packet 3 in its original QoS class (e.g., QoS class A). The downstream router 206" also fakes the presence of the "remarked" packet 3 in the new QoS class (e.g., QoS class B) by allocating (step 308) a proxy packet 218 in the new QoS class (e.g., QoS class B). This is done so that the scheduler 212 can allocate the servicing of another packet in the new QoS class (e.g., QoS class B) when the time comes to service the proxy packet 218. In particular, once the proxy client 218 is scheduled to be serviced, the head-of-line packet 1 in the old QoS class (e.g., QoS class A) is serviced (step 308) as a new QoS class-B packet instead of the proxy client 218. Prior to exiting the downstream router 206", the altered packet 1 is marked (step 310) as a new QoS class-B packet 1 using the special indicator 216b. The special indicator 216b is used to identify the old QoS class (e.g., QoS class A) of packet 1 as well as the new QoS class (e.g., QoS class B). The special indicator 216b also indicates that the class of service of packet 1 has been altered. Again, packet 1 had been promoted. In this example, the packets 1 and 3 that originally belonged to the same flow or QoS class (e.g., QoS class B) did not get reordered but instead were transmitted in the order 1, 3 to another downstream router 206'". This ordering of the packets 1 and 3 is desirable.

In the exemplary packet queuing system 200, the special indicator 216a and 216b can be a packet field value or a bit. For example, in Diffserv it can be a 'special' DSCP (Differentiated Services Code Point) value that indicates for instance that this packet was AF2: Assured Forwarding 2 (A Diffserv Quality of Service Class) and now is AF1: Assured Forwarding 1 (A Diffserv Quality of Service Class). And, the creation of the proxy packet 218 can depend on the implementation of the queuing and scheduling system in hardware. In one instance, it can be a pointer to the head-of-line packet of the second class. Then, when the scheduler 212 decides to schedule the proxy packet 218, the head-of-line packet of the second class is remarked and transmitted.

Figure 1:
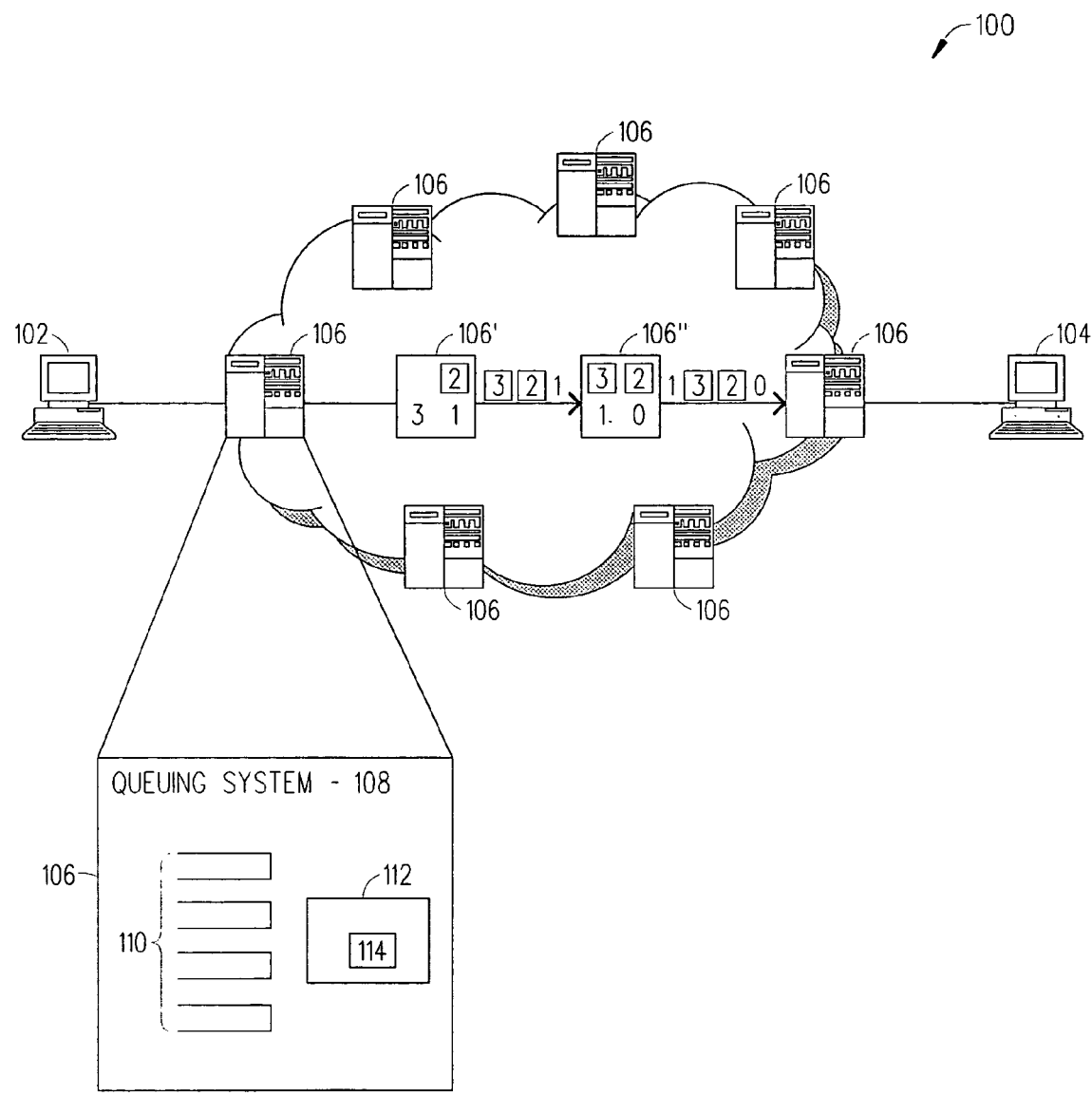
FIG. 1 (PRIOR ART) is a block diagram of a network where a first user communicates with a second user through a series of routers/nodes each of which have a queuing system incorporated therein that implements a traditional queuing method.

From the foregoing, it can be readily appreciated by those skilled in the art that the QoS method 300 of the present invention provides a solution to the reordering problem described above with respect to FIG. 1 in that it eliminates the reordering of packets due to the alteration (promotion or demotion) of one or more of the packet's within a flow while maintaining the QoS treatment of that flow. As described above, the network 200 which includes a router 206' (node 206') and a downstream router 206" (downstream node 206") both implement the QoS queuing method 300 where the router 206' can alter (remark) a QoS class of a packet (client) which is associated with a group of packets (clients) in a manner such that after the downstream router 206″ receives the altered packet and the associated packets it will not reorder the altered packet and the associated packets.

To accomplish this, the router 206′ functions to mark (step 302) the altered packet with a special indicator 216a that indicates the old QoS class and the new QoS class of the altered packet. Then after the altered packet is received at the downstream router 206″, the special indicator 216a is checked (step 304). The downstream router 206″ then functions to queue (step 306) the altered packet in the old QoS class and also queue the other packets in the same flow within the old QoS class. Thereafter, the downstream node 206″ allocates (step 308) a proxy client 218 in the new QoS class. Once the proxy client 218 is scheduled to be serviced, the downstream router 206″ services (step 310) a head-of-line packet selected from the other packets queued in the old QoS class as being in the new QoS class instead of servicing and sending the proxy client 218 to another downstream router 206‴. Finally, the downstream router 206″ functions to mark (step 312) the head-of-line packet with a special indicator 216b that indicates the old QoS class and the new QoS class of the head-of-line packet before sending the marked packet to another downstream node 206‴.

Following are some additional features, advantages and uses of the QoS queuing method 300 of the present invention:

- The implementation of the queuing method 300 does not require any change in any standards. As such, the queuing method 300 can be used in standard bodies like IETF (DiffServ, MPLS, Intserv, . . .) and other standard organizations that have direct or indirect QoS support.
- The QoS queuing method 300 enables better utilization and increased efficiency in a server. Because, clients from a lower class can be promoted to utilize unused reserved bandwidth of the higher classes and clients from a higher class can be demoted when they no longer conform to a certain policy or rate.
- The QoS queuing method 300 allows for Service Level Agreements that involve rate reservation per class and also allows for the efficient usage of the reserved bandwidth for each class when there is not enough traffic to use the reserved rates.
- The QoS queuing method 300 can also be used in cell phone networks so as to allow for efficient usage of any unused reserved bandwidth dedicated for voice or video to speed up wireless internet connectivity.

It should be appreciated that many components and details associated with the network 200 and routers 206 described above are well known in the industry. Therefore, for clarity, the description provided above omitted those well known components and details that are not necessary to understand the present invention.

It should also be appreciated that the present invention does not address the reordering of packets due to routing.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for eliminating the reordering of a plurality of packets when a Quality of Service (QoS) class is altered for one of the packets, said method comprising the steps of:
    marking, at a first node, said altered packet with an indicator that indicates an old QoS class and a new QoS class of said altered packet;
    upon receiving said altered packet at a second node, checking the indicator in said altered packet;
    queuing, at said second node, said altered packet in the old QoS class and said remaining plurality of packets in the old QoS class;
    allocating, at said second node, a proxy packet in the new QoS class;
    once the proxy packet is scheduled to be serviced at said second node, servicing a head-of-line packet from said remaining plurality of packets queued in the old QoS class as being in the new QoS class instead of servicing and sending the proxy packet to a third node; and
    marking, at said second node, said head-of-line packet with an indicator that indicates the old QoS class and the new QoS class of said head-of-line packet before sending said head-of-line packet to the third node.

2. The method of claim 1, wherein said altered packet was promoted to a higher precedence QoS class.

3. The method of claim 1, wherein said altered packet was demoted to a lower precedence QoS class.

4. The method of claim 1, wherein said plurality of packets are packets that belong to a same flow in a communications system.

5. The method of claim 1, wherein said first, second and third nodes are routers.

6. The method of claim 1, wherein said altered packet and said head-of-line packet have indicators which are packet field values or bits.

* * * * *